Jan. 20, 1931.    E. C. BALLARD    1,789,330
COOKING UTENSIL
Filed May 22, 1929

INVENTOR
Eva C. Ballard
BY
Kenyon & Kenyon
ATTORNEYS

Patented Jan. 20, 1931

1,789,330

UNITED STATES PATENT OFFICE

EVA C. BALLARD, OF NEW YORK, N. Y.

COOKING UTENSIL

Application filed May 22, 1929. Serial No. 364,993.

This invention relates to cooking utensils and more particularly to utensils of the type and character utilized in connection with oil or gas stoves for toasting bread.

Heretofore difficulty has been experienced with all types of toasters available for utilization in connection with stoves of the flame type, particularly oil stoves. Ordinarily a considerable time has been necessary to permit one side of the bread being toasted to reach its proper state and accordingly a repetition of this time for toasting the other side thereof. As a result of this continued subjection to heat, the bread became so dry and hard as to be unpalatable and in some instances entirely undesirable as food.

An object of the present invention is to provide a new, simple, efficient and inexpensive toasting device.

According to the present invention, the difficulties heretofore experienced are overcome by providing a device for use in connection with oil stoves and the like which device permits the bread to become evenly toasted in a very short time, dispensing with the undesirable delay and resultant dryness and hardness.

Other features and objects of the invention will become apparent by reference to the following detailed description read in the light of the accompanying drawings, wherein Fig. 1 is a perspective plan view of a device embodying the invention.

Figure 1:
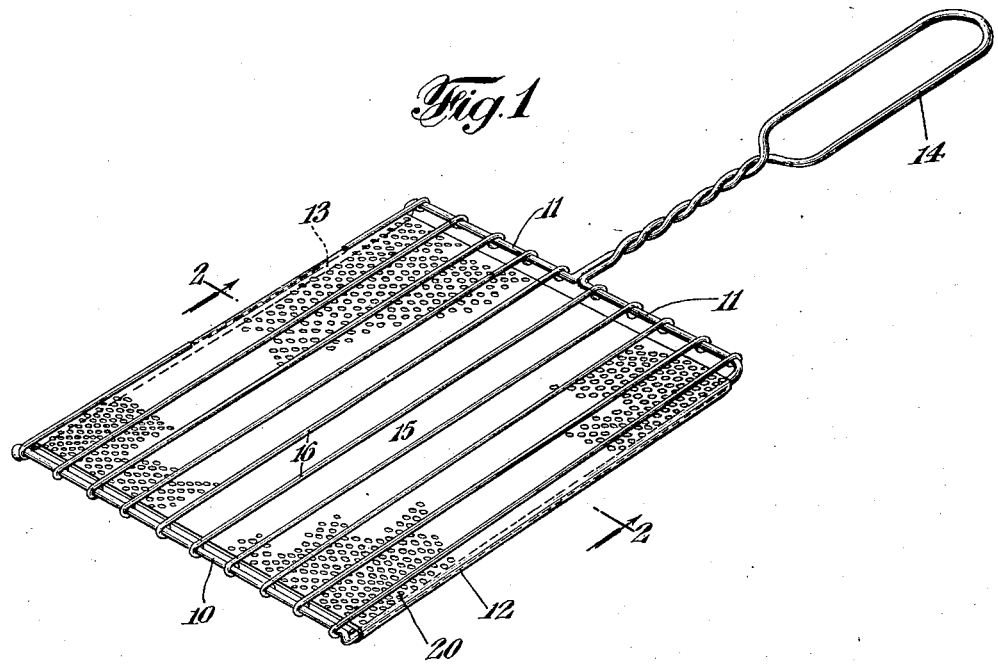
Figure 2:
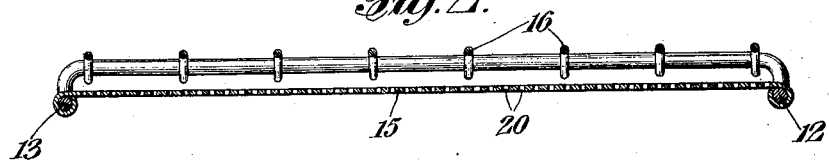
Fig. 2 is a section taken on the lines 2—2 of Fig. 1.
Figure 3:
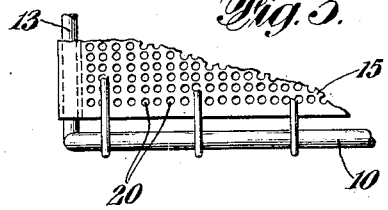
Fig. 3 is a fragmentary plan view of a portion of the device illustrated in Fig. 1 on a large scale.

Referring now to the drawings, it will be seen that the device embodying the invention and herein illustrated is composed of a frame member formed of a single piece of wire in the shape of end members 10 and 11 and side members 12 and 13. The end member 11 is in effect in two parts since the wire forming the same is twisted into the shape of a handle 14 extending from approximately the center of the end portion 11. It will be noted that the side members 12 and 13 are formed by bending the wire into a horizontal plane spaced a slight distance below the plane of the end members 10 and 11.

The purpose of providing the frame member in two different planes is to permit a sheet 15 of foraminated metal to be fastened to the side members 12 and 13 to form a base of the device. The sheet of foraminated metal may be secured to the frame members 12 and 13 in any desired manner and in the drawings this method of so securing the parts together is illustrated as consisting in bending the free edges of the sheet 15 around each of the respective side members 12 and 13. Longitudinal movement of the member 15 is of course prevented due to the upward bend of the frame wire between the side members and the end members.

In the drawings the sheet of foraminated metal 15 is illustrated as composed of a metallic sheet punched with a number of very small openings 20 closely spaced. The purpose of this sheet of material is to in effect break up any possible flame which might reach the device when positioned on the stove but at the same time to permit the passage through the member of the maximum quantity of heat.

For supporting the bread to be toasted in position over the sheet of foraminated material there are provided a number of longitudinally extending members 16 in the form of wires of diameter smaller than that of the wire composing the frame, these smaller wires extending between and secured to the respective end members 10 and 11.

It will be evident from the foregoing that the operation of the device is substantially as follows.

The toaster may be positioned directly over a burner of an oil or similar stove with the sheet of foraminated material closest to the flame. The bread to be toasted may then be laid upon the longitudinally extending supports 16 and in this position it will become toasted in a very short while. The sheet 15 absorbs a great quantity of the heat radiating it to the bread positioned a slight distance thereabove and in addition to this method of application of heat, the great number of minute openings 20 in the plate permit the passage therethrough of the maximum quantity of heat to the bread without the disadvantage occasioned by contact of the flame with the bread itself.

While in the drawings the sheet of material has been illustrated as being provided with a number of openings punched therein, it is to be understood that in practice the sheet should be provided with as many openings as is possible to permit the passage of the greatest quantity of heat. It is to be further understood that the invention is not to be limited to the illustrated embodiment but is to be limited only by the scope of the following claims.

I claim:

1. A device of the character described comprising a unitary handle and frame member formed of a single metallic strip, a sheet of foraminated material secured to the sides of said frame member and a plurality of spaced rods secured to the ends of said frame member and spaced above said sheet of foraminated material.

2. A device of the character described comprising a unitary handle and frame member formed of a single metallic strip and having end and side portions lying in planes spaced apart from each other, a sheet of metal secured between said side portions and provided with a plurality of openings spaced as closely as possible and a plurality of spaced rods secured between the end portions and above said sheet.

In testimony whereof, I have signed my name to this specification.

EVA C. BALLARD.